(12) United States Patent
Matsubara et al.

(10) Patent No.: US 11,807,218 B2
(45) Date of Patent: Nov. 7, 2023

(54) CONTROL DEVICE FOR VEHICLE

(71) Applicants: TOYOTA JIDOSHA KABUSHIKI KAISHA, Toyota (JP); AISIN CORPORATION, Kariya (JP)

(72) Inventors: Keigo Matsubara, Nagoya (JP); Masayuki Baba, Toyota (JP); Tomoya Inayoshi, Anjo (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 174 days.

(21) Appl. No.: 17/465,105

(22) Filed: Sep. 2, 2021

(65) Prior Publication Data
US 2022/0097679 A1 Mar. 31, 2022

(30) Foreign Application Priority Data

Sep. 30, 2020 (JP) ................ 2020-166515

(51) Int. Cl.
*B60W 20/40* (2016.01)
*B60K 6/387* (2007.10)
(Continued)

(52) U.S. Cl.
CPC .............. *B60W 20/40* (2013.01); *B60K 6/24* (2013.01); *B60K 6/26* (2013.01); *B60K 6/387* (2013.01);
(Continued)

(58) Field of Classification Search
CPC ........... B60Y 2200/92; B60Y 2400/46; B60W 10/02; B60W 10/06; B60W 10/08; B60W 20/40; B60W 2540/10; B60W 2710/021; B60W 2710/023; B60W 2710/027; B60W 2710/0644; B60W 2710/083; B60K 2006/268; B60K 2006/4825; B60K 6/24; B60K 6/26; B60K 6/387
See application file for complete search history.

(56) References Cited

U.S. PATENT DOCUMENTS 6,018,198 A * 1/2000 Tsuzuki ................ B60W 10/08
903/910
7,730,982 B2 * 2/2010 Hidaka et al. ........ B60W 20/40
(Continued)

FOREIGN PATENT DOCUMENTS

| JP | 2002-349310 A | 12/2002 |
| JP | 2014-159207 A | 9/2014 |
| JP | 2016-199170 A | 12/2016 |

*Primary Examiner* — Carl C Staubach
(74) *Attorney, Agent, or Firm* — Oliff PLC

(57) ABSTRACT

A control device for a vehicle, the control device comprising an electronic control unit configured to: perform, when the engine is started, a first clutch actuator control in which the clutch transmits a cranking torque for increasing a rotation speed of the engine during a transition in which the control state of the clutch is switched from a released state to an engaged state; perform, when the engine is started, first control for outputting the cranking torque by the electric motor and second control for starting operation of the engine; and perform, after the first clutch actuator control is completed, a second clutch actuator control in which a torque capacity of the clutch is set to a predetermined torque smaller than the cranking torque.

3 Claims, 7 Drawing Sheets

(51) Int. Cl.
*B60K 6/24* (2007.10)
*B60K 6/26* (2007.10)
*B60W 10/08* (2006.01)
*B60W 10/02* (2006.01)

(52) U.S. Cl.
CPC ............ *B60W 10/02* (2013.01); *B60W 10/08* (2013.01); *B60K 2006/268* (2013.01); *B60W 2710/021* (2013.01); *B60W 2710/083* (2013.01); *B60Y 2200/92* (2013.01); *B60Y 2400/46* (2013.01)

(56) References Cited

U.S. PATENT DOCUMENTS

| | | | | |
|---|---|---|---|---|
| 7,878,281 | B2* | 2/2011 | Tanishima | B60K 6/547 180/65.265 |
| 9,180,878 | B2* | 11/2015 | Matsui et al. | B60W 20/40 |
| 2002/0170758 | A1 | 11/2002 | Shimabukuro et al. | |
| 2014/0303822 | A1* | 10/2014 | Kawamura | B60W 20/40 180/65.265 |
| 2016/0229387 | A1* | 8/2016 | Hata | B60W 10/08 |
| 2021/0094532 | A1* | 4/2021 | Matsubara | B60W 20/40 |
| 2021/0129830 | A1* | 5/2021 | Matsubara | B60W 10/06 |
| 2021/0291807 | A1* | 9/2021 | Hayasaka | B60W 10/10 |
| 2022/0097678 | A1* | 3/2022 | Matsubara | B60W 10/06 |
| 2022/0097680 | A1* | 3/2022 | Matsubara | B60K 6/24 |
| 2022/0111719 | A1* | 4/2022 | Matsubara | B60K 6/48 |
| 2022/0227218 | A1* | 7/2022 | Matsubara | F16H 61/0009 |
| 2022/0402480 | A1* | 12/2022 | Matsubara | B60W 30/19 |
| 2023/0038261 | A1* | 2/2023 | Matsubara | B60W 10/06 |

* cited by examiner

FIG. 3

K0 CONTROL PHASE DEFINITION

| NAME OF PHASE | DEFINITION OF STATE |
|---|---|
| K0 STANDBY | STANDBY WITHOUT STARTING K0 CONTROL AT START |
| QUICK APPLY | TEMPORARILY APPLY HIGH HYDRAULIC PRESSURE TO QUICKLY COMPLETE PACKING AND IMPROVE INITIAL RESPONSIVENESS OF HYDRAULIC PRESSURE |
| CONSTANT PRESSURE STANDBY AT TIME OF PACKING | STANDBY AT CONSTANT PRESSURE TO COMPLETE PACKING |
| K0 CRANKING | CRANK ENGINE BY K0 CLUTCH |
| QUICK DRAIN | TEMPORARILY OUTPUT LOW HYDRAULIC PRESSURE SO THAT PACK END PRESSURE CAN BE QUICKLY MADE TO STANDBY TO IMPROVE INITIAL RESPONSIVENESS OF HYDRAULIC PRESSURE |
| CONSTANT PRESSURE STANDBY BEFORE RE-ENGAGEMENT | STANDBY AT PREDETERMINED TORQUE SO AS NOT TO DISTURB COMPLETE COMBUSTION OF ENGINE |
| INITIAL ROTATION SYNCHRONIZATION | CONTROL K0 TORQUE TO ASSIST INCREASE IN ENGINE ROTATION SPEED IN ORDER TO QUICKLY SYNCHRONIZE ENGINE ROTATION SPEED AND MG ROTATION SPEED |
| INTERMEDIATE ROTATION SYNCHRONIZATION | CONTROL K0 TORQUE SO THAT ENGINE HAS APPROPRIATE BLOWING AMOUNT |
| END ROTATION SYNCHRONIZATION | CONTROL K0 TORQUE TO SYNCHRONIZE ENGINE ROTATION SPEED AND MG ROTATION SPEED |
| ENGAGEMENT TRANSITION SWEEP | BRING K0 CLUTCH INTO ENGAGED STATE |
| FULL ENGAGEMENT TRANSITION SWEEP | BRING K0 CLUTCH INTO FULLY ENGAGED STATE (INCREASE K0 TORQUE TO STATE IN WHICH SAFETY FACTOR THAT CAN GUARANTEE ENGAGEMENT IS APPLIED) |
| FULL ENGAGEMENT | MAINTAIN K0 CLUTCH IN FULLY ENGAGED STATE |
| BACKUP SWEEP | ENGAGE K0 CLUTCH (BACKUP CONTROL) |
| CALCULATION STOP | STOP CALCULATION OF TORQUE AND HYDRAULIC PRESSURE WHILE FAIL-SAFE CONTROL IS BEING EXECUTED |

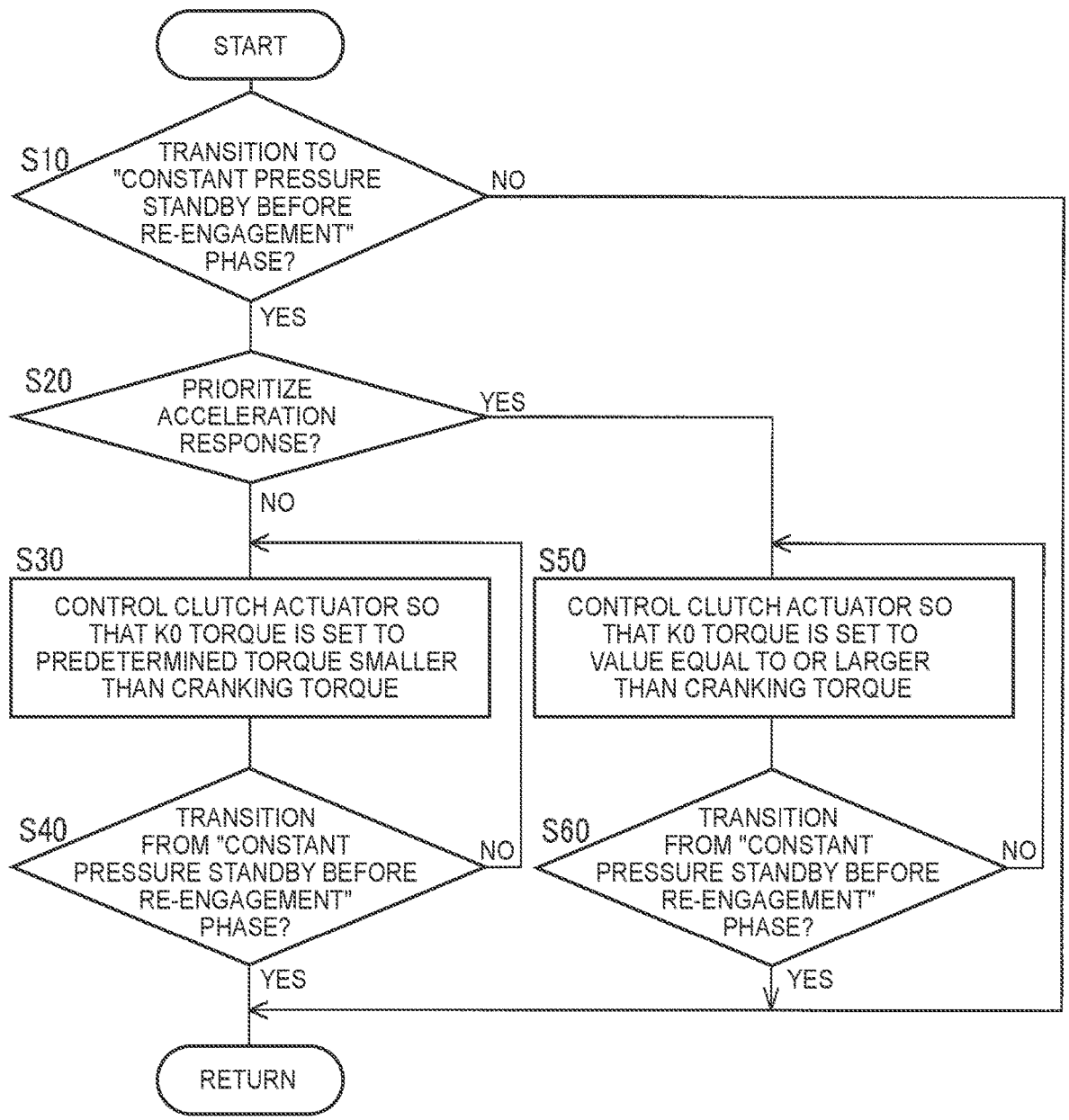

US 11,807,218 B2

CONTROL DEVICE FOR VEHICLE

CROSS-REFERENCE TO RELATED APPLICATION

This application claims priority to Japanese Patent Application No. 2020-166515 filed on Sep. 30, 2020, incorporated herein by reference in its entirety.

BACKGROUND

1. Technical Field

The present disclosure relates to a control device for a vehicle including an engine, an electric motor, and a clutch capable of disconnecting the connection between the engine and the electric motor.

2. Description of Related Art

There is well known a control device for a vehicle including an engine, an electric motor connected to a power transmission path between the engine and drive wheels so as to be capable of transmitting power, and a clutch that is provided between the engine and the electric motor in the power transmission path. The control state of the clutch is switched by controlling a clutch actuator. An example of the above control device is a drive control device for a hybrid vehicle described in Japanese Unexamined Patent Application Publication No. 2002-349310 (JP 2002-349310 A). JP 2002-349310 A discloses a technology in which, when the engine is started, the command value of the hydraulic pressure supplied to the clutch is increased and controlled in accordance with the increase in the engine rotation speed for the synchronous rotation with the electric motor rotation speed, thereby the control state of the clutch is switched from the released state to the engaged state.

SUMMARY

When the engine is started and the engine rotation speed is increased during the transition of the control state of the clutch from the released state to the engaged state, the increase in the torque capacity of the clutch by increasing and controlling the hydraulic pressure of the clutch causes the need to increase the engine rotation speed considering the inertia on the downstream side of the clutch such as the electric motor. In this case, the starting shock may increase and the drivability may be deteriorated, or the energy efficiency may be deteriorated, and thus the starting performance of the engine may be deteriorated.

The present disclosure has been made in the background of the above circumstances, and an object of the present disclosure is to provide a control device for a vehicle capable of improving the starting performance of an engine when the engine is started.

An aspect of the present disclosure relates to a control device for a vehicle including an engine, an electric motor connected to a power transmission path between the engine and drive wheels so as to be able to transmit power, and a clutch provided between the engine and the electric motor in the power transmission path, a control state of the clutch configured to be switched by controlling a clutch actuator. The control device includes an electronic control unit configured to: perform, when the engine is started, a first clutch actuator control in which the clutch transmits a cranking torque for increasing a rotation speed of the engine during a transition in which the control state of the clutch is switched from a released state to an engaged state; perform, when the engine is started, first control for outputting the cranking torque by the electric motor and second control for starting operation of the engine; and perform, after the first clutch actuator control is completed, a second clutch actuator control in which a torque capacity of the clutch is set to a predetermined torque smaller than the cranking torque.

According to the above aspect, when the engine is started, after the control of the clutch actuator in which the clutch transmits the cranking torque is completed, the clutch actuator is controlled so as to temporarily set the torque capacity of the clutch to a predetermined torque smaller than the cranking torque. Thus, after the engine rotation speed is increased by cranking, the engine rotation speed is increased in a state where the influence of inertia on the downstream side of the clutch such as the electric motor is suppressed. As a result, the engine rotation speed is quickly increased toward the synchronous rotation with the electric motor rotation speed, which suppresses the starting shock to improve the drivability, or improves the energy efficiency. Therefore, when the engine is started, the starting performance of the engine can be improved.

In the above aspect, the electronic control unit may be configured to perform the second clutch actuator control during a period of standby for a complete combustion of the engine.

According to the above aspect, the clutch actuator is controlled so that the torque capacity of the clutch is set to the predetermined torque during the period of the standby for the complete combustion of the engine, so that after the engine rotation speed is increased by cranking, the disturbance to the complete combustion of the engine is suppressed and the deterioration of the starting control of the engine is suppressed.

In the above aspect, the electronic control unit may be configured to proceed with switching of the clutch to the engaged state after the complete combustion of the engine is determined.

According to the above aspect, after the complete combustion of the engine is determined, the clutch actuator is controlled so as to proceed with the switching of the clutch to the engaged state, so that the control state of the clutch is appropriately switched to the engaged state while suppressing the hindrance to the self-sustaining rotation of the engine during the transition when the control state of the clutch is switched from the released state to the engaged state.

In the above aspect, the electronic control unit may be configured to restrict the second clutch actuator control when a start of the engine is requested due to an increase in a drive request amount for the vehicle by a driver.

According to the above aspect, the control of the clutch actuator in which the torque capacity of the clutch is set to the predetermined torque is restricted when the start of the engine is requested due to an increase in the drive request amount by the driver. Thus, the switching of the clutch to the engaged state is accelerated. As a result, the output torque of the engine is quickly transmitted to the drive wheels side, and the acceleration response is improved.

In the above aspect, the electronic control unit may be configured to set the torque capacity of the clutch to a value equal to or larger than the cranking torque instead of executing the second clutch actuator control when a start of the engine is requested due to an increase in a drive request amount for the vehicle by a driver.

According to the above aspect, when the start of the engine is requested due to an increase in the drive request amount by the driver, instead of the control of the clutch actuator in which the torque capacity of the clutch is set to the predetermined torque, the clutch actuator is controlled so that the torque capacity of the clutch is equal to or larger than the cranking torque. Thus, the switching of the clutch to the engaged state is accelerated. As a result, the output torque of the engine is quickly transmitted to the drive wheels side, and the acceleration response is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a chart illustrating each phase in a K0 control phase definition;

FIG. 6 is a flowchart illustrating a main part of a control operation of an electronic control device, and is a flowchart illustrating the control operation for improving the starting performance of the engine when the engine is started.

DETAILED DESCRIPTION OF EMBODIMENTS

Hereinafter, examples of the present disclosure will be described in detail with reference to the drawings.

Figure 1:
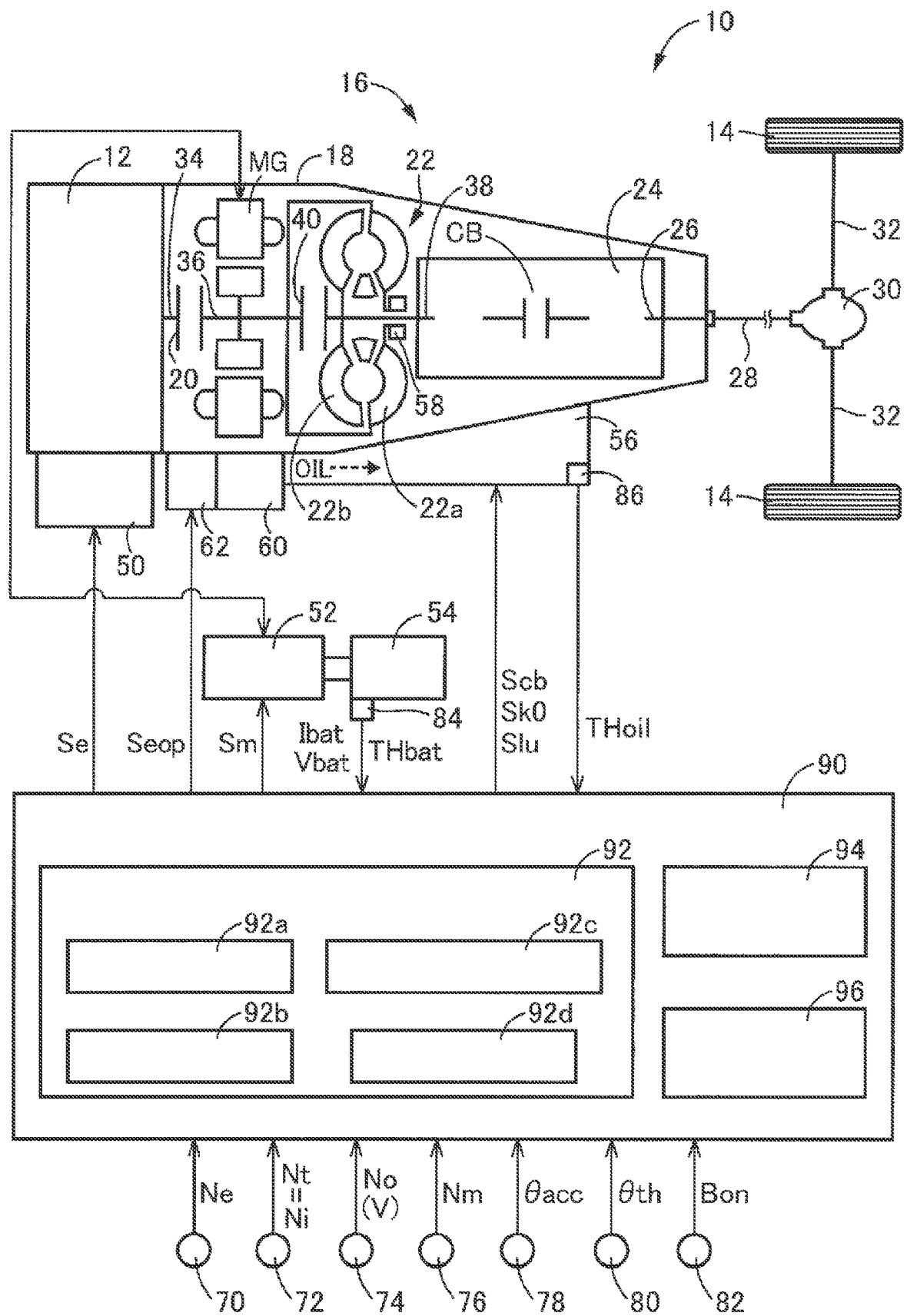
FIG. 1 is a diagram illustrating a schematic configuration of a vehicle to which the present disclosure is applied, and is a diagram illustrating control functions and a main part of a control system for various controls in the vehicle.

FIG. 1 is a diagram illustrating a schematic configuration of a vehicle 10 to which the present disclosure is applied, and is a diagram illustrating control functions and a main part of a control system for various controls in the vehicle 10. In FIG. 1, the vehicle 10 is a hybrid vehicle including an engine 12 and an electric motor MG, which are driving force sources for traveling. Further, the vehicle 10 includes drive wheels 14 and a power transmission device 16 provided in a power transmission path between the engine 12 and the drive wheels 14.

The engine 12 is a known internal combustion engine such as a gasoline engine or a diesel engine. In the engine 12, an engine torque Te that is an output torque of the engine 12 is controlled by controlling an engine control device 50 including a throttle actuator, a fuel injection device, an ignition device, and the like provided in the vehicle 10 by an electronic control device 90 described later.

The electric motor MG is a rotary electric machine having a function as a motor for generating mechanical power from electric power and a function as a generator for generating electric power from mechanical power, and is a so-called motor generator. The electric motor MG is connected to a battery 54 provided in the vehicle 10 via an inverter 52 provided in the vehicle 10. In the electric motor MG, the MG torque Tm that is the output torque of the electric motor MG is controlled by controlling the inverter 52 by the electronic control device 90 described later. The MG torque Tm is, for example, a power running torque for the positive torque on the acceleration side and a regenerative torque for the negative torque on the deceleration side when the rotation direction of the electric motor MG is a positive rotation that is the same as the rotation direction of the engine 12 when the engine 12 is operating. Specifically, the electric motor MG generates power for traveling with the electric power supplied from the battery 54 via the inverter 52 instead of the engine 12 or in addition to the engine 12. Further, the electric motor MG generates electric power with the power of the engine 12 or the driven force input from the drive wheels 14. The electric power generated by the power generation of the electric motor MG is stored in the battery 54 via the inverter 52. The battery 54 is a power storage device that transmits and receives electric power to and from the electric motor MG. Unless otherwise specified, the electric power also means the electric energy. Unless otherwise specified, the power also means the torque and force.

The power transmission device 16 includes a K0 clutch 20, a torque converter 22, an automatic transmission 24, and the like in a case 18 that is a non-rotating member attached to a vehicle body. The K0 clutch 20 is a clutch provided between the engine 12 and the electric motor MG in the power transmission path between the engine 12 and the drive wheels 14. The torque converter 22 is connected to the engine 12 via the K0 clutch 20. The automatic transmission 24 is connected to the torque converter 22 and is interposed in the power transmission path between the torque converter 22 and the drive wheels 14. The torque converter 22 and the automatic transmission 24 each constitute a part of the power transmission path between the engine 12 and the drive wheels 14. Further, the power transmission device 16 includes a propeller shaft 28 connected to a transmission output shaft 26 that is an output rotating member of the automatic transmission 24, a differential gear 30 connected to the propeller shaft 28, a pair of drive shafts 32 connected to the differential gear 30, and the like. Further, the power transmission device 16 includes an engine connecting shaft 34 that connects the engine 12 and the K0 clutch 20, an electric motor connecting shaft 36 that connects the K0 clutch 20 and the torque converter 22, and the like.

The electric motor MG is connected to the electric motor connecting shaft 36 in the case 18 so as to be able to transmit power. The electric motor MG is connected to the power transmission path between the engine 12 and the drive wheels 14, particularly the power transmission path between the K0 clutch 20 and the torque converter 22 so as to be able to transmit power. That is, the electric motor MG is connected to the torque converter 22 and the automatic transmission 24 so as to be able to transmit power without going through the K0 clutch 20. From a different point of view, the torque converter 22 and the automatic transmission 24 each constitute a part of the power transmission path between the electric motor MG and the drive wheels 14. The torque converter 22 and the automatic transmission 24 transmit the drive force from each of the driving force sources of the engine 12 and the electric motor MG to the drive wheels 14.

The torque converter 22 includes a pump impeller 22a connected to the electric motor connecting shaft 36, and a turbine impeller 22b connected to a transmission input shaft 38 that is an input rotating member of the automatic transmission 24. The pump impeller 22a is connected to the engine 12 via the K0 clutch 20 and is directly connected to the electric motor MG. The pump impeller 22a is an input member of the torque converter 22, and the turbine impeller 22b is an output member of the torque converter 22. The electric motor connecting shaft 36 is also an input rotating member of the torque converter 22. The transmission input shaft 38 is also an output rotating member of the torque converter 22, which is integrally provided with a turbine shaft that is rotationally driven by the turbine impeller 22b. The torque converter 22 is a fluid transmission device that transmits the drive force from each of the driving force sources (engine 12, electric motor MG) to the transmission input shaft 38 via a fluid. The torque converter 22 includes a lock-up (LU) clutch 40 that connects the pump impeller 22a and the turbine impeller 22b. The LU clutch 40 is a directly connected clutch that connects the input/output rotating members of the torque converter 22, that is, a known lock-up clutch.

The operating state, that is, the control state of the LU clutch 40 is switched when the LU clutch torque Tlu, which is the torque capacity of the LU clutch 40, is changed by the adjusted LU hydraulic pressure PRlu supplied from a hydraulic control circuit 56 provided in the vehicle 10. The control state of the LU clutch 40 includes a fully released state in which the LU clutch 40 is released, a slip state in which the LU clutch 40 is engaged with slippage, and a fully engaged state in which the LU clutch 40 is engaged. When the LU clutch 40 is in the fully released state, the torque converter 22 is brought into a torque converter state in which a torque amplification effect can be obtained. Further, when the LU clutch 40 is in the fully engaged state, the torque converter 22 is brought into a lock-up state in which the pump impeller 22a and the turbine impeller 22b are integrally rotated.

The automatic transmission 24 is a known planetary gear automatic transmission including, for example, one set or a plurality of sets of planetary gear devices (not shown) and a plurality of engaging devices CB. The engaging device CB is a hydraulic friction engaging device composed of, for example, a multi-plate or a single-plate clutch and a brake pressed by a hydraulic actuator, a band brake tightened by the hydraulic actuator, or the like. In the engaging device CB, the control state such as the engaged state and the released state is switched by changing the CB torque Tcb, which is the respective torque capacity, by the adjusted CB hydraulic pressure PRcb supplied from the hydraulic control circuit 56.

The automatic transmission 24 is a stepped transmission in which any one of a plurality of gears (also referred to as gear stages) having different gear ratios γat (=automatic transmission (AT) input rotation speed Ni/AT output rotation speed No) is established by engaging any of the engaging devices CB. In the automatic transmission 24, the gear stages are switched, that is, a plurality of gear stages are selectively established in accordance with the accelerator operation of the driver, the vehicle speed V, and the like by the electronic control device 90 described later. The AT input rotation speed Ni is the rotation speed of the transmission input shaft 38 and is the input rotation speed of the automatic transmission 24. The AT input rotation speed Ni is also the rotation speed of the output rotation member of the torque converter 22, and is the same value as the turbine rotation speed Nt, which is the output rotation speed of the torque converter 22. The AT input rotation speed Ni can be represented by the turbine rotation speed Nt. The AT output rotation speed No is the rotation speed of the transmission output shaft 26 and is the output rotation speed of the automatic transmission 24.

The K0 clutch 20 is a wet or dry friction engaging device composed of, for example, a multi-plate or a single-plate clutch pressed by a hydraulic clutch actuator 120 described later. The control state of the K0 clutch 20 is switched between states such as the engaged state and the released state by controlling the clutch actuator 120 by the electronic control device 90 described later.

Figure 2:
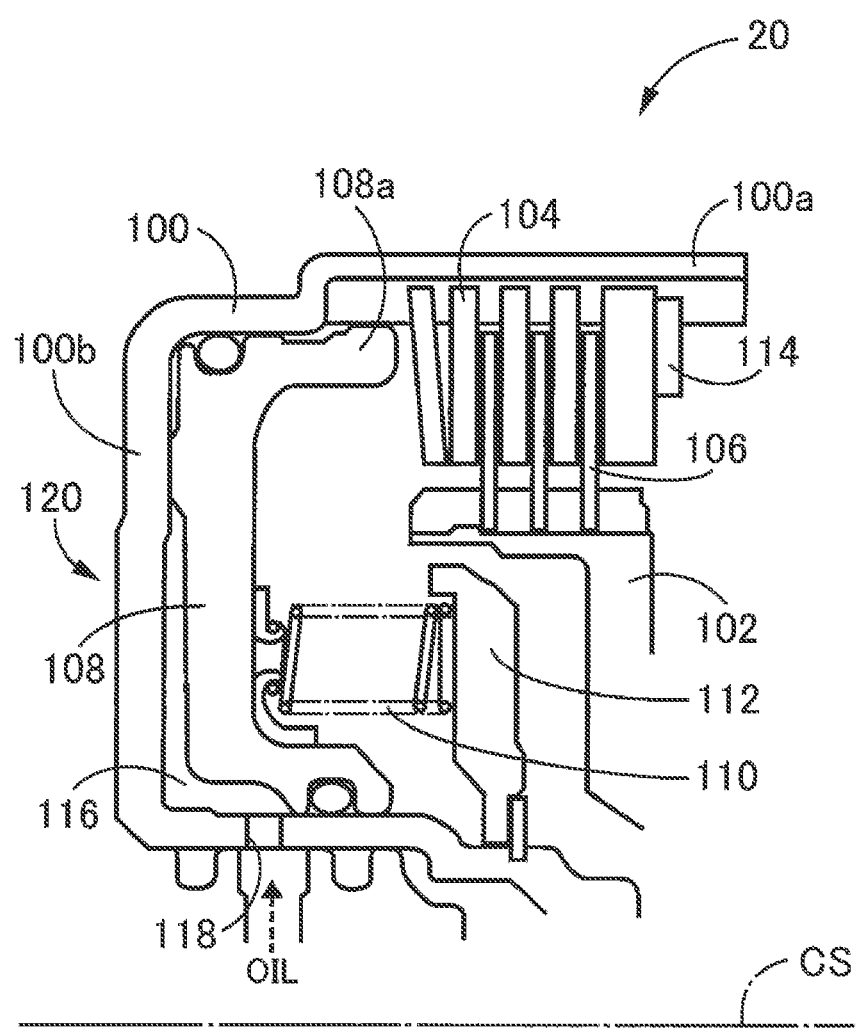
FIG. 2 is a partial sectional view showing an example of a K0 clutch.

FIG. 2 is a partial sectional view showing an example of the K0 clutch 20. In FIG. 2, the K0 clutch 20 includes a clutch drum 100, a clutch hub 102, separator plates 104, friction plates 106, a piston 108, a return spring 110, a spring receiving plate 112, and a snap ring 114. The clutch drum 100 and the clutch hub 102 are provided on the same axis CS. FIG. 2 shows the radial outer peripheral portion of the K0 clutch 20 in the upper half of the axis CS. The axis CS is the axis of the engine connecting shaft 34, the electric motor connecting shaft 36, and the like. The clutch drum 100 is connected to, for example, the engine connecting shaft 34, and is rotated integrally with the engine connecting shaft 34. The clutch hub 102 is connected to, for example, the electric motor connecting shaft 36, and is rotated integrally with the electric motor connecting shaft 36. Outer peripheral edges of a plurality of substantially annular plate-shaped separator plates 104 are fitted to the inner peripheral surface of a tubular portion 100a of the clutch drum 100 so as not to rotate relative to each other, that is, spline-fitted thereto. The friction plates 106 are interposed between the separator plates 104, and inner peripheral edges of a plurality of substantially annular plate-shaped friction plates 106 are fitted to the outer peripheral surface of the clutch hub 102 so as not to rotate relative to each other, that is, spline-fitted thereto. The piston 108 is provided with a pressing portion 108a extending in the direction toward the separator plates 104 and the friction plates 106 on the outer peripheral edge. The return spring 110 is interposed between the piston 108 and the spring receiving plate 112, and urges the piston 108 so that a part of the piston 108 abuts a bottom plate portion 100b of the clutch drum 100. That is, the return spring 110 functions as a spring element that urges the piston 108 so that the separator plates 104 and the friction plates 106 are not engaged. The snap ring 114 is fixed to the tubular portion 100a of the clutch drum 100 at a position where the separator plates 104 and the friction plates 106 are sandwiched between the snap ring 114 and the pressing portion 108a of the piston 108. In the K0 clutch 20, an oil chamber 116 is provided between the piston 108 and the bottom plate portion 100b of the clutch drum 100. An oil passage 118 leading to the oil chamber 116 is provided in the clutch drum 100. In the K0 clutch 20, the clutch actuator 120 as a hydraulic actuator is composed of the clutch drum 100, the piston 108, the return spring 110, the spring receiving plate 112, the oil chamber 116, and the like.

The hydraulic control circuit 56 supplies the K0 hydraulic pressure PRk0, which is the adjusted hydraulic pressure, to the clutch actuator 120. In the K0 clutch 20, when the K0 hydraulic pressure PRk0 is supplied from the hydraulic control circuit 56 to the oil chamber 116 through the oil passage 118, the K0 hydraulic pressure PRk0 causes the piston 108 to move toward the separator plates 104 and the friction plates 106 against the urging force of the return spring 110, causing the pressing portion 108a of the piston 108 to press the separator plates 104 and the friction plates 106. The K0 clutch 20 is switched to the engaged state when the separator plates 104 and the friction plates 106 are pressed. The control state of the K0 clutch 20 is switched by changing the K0 torque Tk0, which is the torque capacity of the K0 clutch 20, with the K0 hydraulic pressure PRk0.

The K0 torque Tk0 is determined by, for example, the friction coefficient of the friction material of the friction plates 106, the K0 hydraulic pressure PRk0, and the like. In the K0 clutch 20, the oil chamber 116 is filled with hydraulic oil OIL, and the pressing force (=PRk0×piston pressure receiving area) of the piston 108 against the urging force of the return spring 110 causes the clearances between the separator plates 104 and the friction plates 106 to be tightened. In other words, the pack clearance of the K0 clutch 20 is tightened, and so-called packing is completed. In the K0 clutch 20, the K0 torque Tk0 is generated by further increasing the K0 hydraulic pressure PRk0 from the state where the packing is completed. That is, the state where the packing of the K0 clutch 20 is completed is a state in which the K0 clutch 20 starts to generate a torque capacity when the K0 hydraulic pressure PRk0 is increased from the state. The K0 hydraulic pressure PRk0 for packing the K0 clutch 20 is a K0 hydraulic pressure PRk0 for establishing the state where the piston 108 reaches the stroke end and the K0 torque Tk0 is not generated.

Returning to FIG. 1, in the engaged state of the K0 clutch 20, the pump impeller 22a and the engine 12 are integrally rotated via the engine connecting shaft 34. That is, when the K0 clutch 20 is engaged, the engine 12 and the drive wheels 14 are connected so as to be able to transmit power. On the other hand, in the released state of the K0 clutch 20, the power transmission between the engine 12 and the pump impeller 22a is cut off. That is, when the K0 clutch 20 is released, the connection between the engine 12 and the drive wheels 14 is disconnected. Since the electric motor MG is connected to the pump impeller 22a, the K0 clutch 20 is provided in the power transmission path between the engine 12 and the electric motor MG, and functions as a clutch that connects and disconnects the power transmission path, that is, a clutch that connects and disconnects the engine 12 and the electric motor MG. In other words, the K0 clutch 20 is a clutch for connection/disconnection that connects the engine 12 and the electric motor MG by being engaged, and disconnects the connection between the engine 12 and the electric motor MG by being released.

In the power transmission device 16, when the K0 clutch 20 is engaged, the power output from the engine 12 is transmitted from the engine connecting shaft 34 to the drive wheels 14 via the K0 clutch 20, the electric motor connecting shaft 36, the torque converter 22, the automatic transmission 24, the propeller shaft 28, the differential gear 30, the drive shafts 32, and the like in this order. Further, the power output from the electric motor MG is transmitted from the electric motor connecting shaft 36 to the drive wheels 14 via the torque converter 22, the automatic transmission 24, the propeller shaft 28, the differential gear 30, the drive shafts 32, and the like in this order regardless of the control state of the K0 clutch 20.

The vehicle 10 includes a mechanical oil pump MOP 58, an electric oil pump EOP 60, a pump motor 62, and the like. The MOP 58 is connected to the pump impeller 22a and is rotationally driven by a driving force source (engine 12, electric motor MG) to discharge the hydraulic oil OIL used in the power transmission device 16. The pump motor 62 is a motor dedicated to the EOP 60 for rotationally driving the EOP 60. The EOP 60 is rotationally driven by the pump motor 62 to discharge the hydraulic oil OIL. The hydraulic oil OIL discharged by the MOP 58 and the EOP 60 is supplied to the hydraulic control circuit 56. The hydraulic control circuit 56 supplies the CB hydraulic pressure PRcb, the K0 hydraulic pressure PRk0, the LU hydraulic pressure PRlu, and the like, which are adjusted based on the hydraulic oil OIL discharged by the MOP 58 and/or the EOP 60.

The vehicle 10 further includes the electronic control device 90 including a control device for the vehicle 10 related to starting control of the engine 12. The electronic control device 90 is configured to include, for example, a so-called microcomputer provided with a central processing unit (CPU), random access memory (RAM), read-only memory (ROM), an input/output interface, and the like. The CPU performs signal processing in accordance with a program stored in the ROM in advance while using the temporary storage function of the RAM, thereby executing various controls of the vehicle 10. The electronic control device 90 includes computers for engine control, electric motor control, hydraulic pressure control, and the like, as necessary.

The electronic control device 90 is supplied with various signals (for example, the engine rotation speed Ne, which is the rotation speed of the engine 12, the turbine rotation speed Nt, which has the same value as the AT input rotation speed Ni, the AT output rotation speed No corresponding to the vehicle speed V, the MG rotation speed Nm, which is the rotation speed of the electric motor MG, the accelerator operation amount θacc, which is the accelerator operation amount of the driver indicating the magnitude of the acceleration operation of the driver, the throttle valve opening θth, which is the opening degree of the electronic throttle valve, the brake-on signal Bon, which is a signal indicating that the brake pedal for operating the wheel brake is being operated by the driver, the battery temperature THbat, the battery charge/discharge current Ibat, and the battery voltage Vbat of the battery 54, the hydraulic oil temperature THoil, which is the temperature of the hydraulic oil OIL in the hydraulic control circuit 56, etc.) based on detection values detected by various sensors (for example, an engine rotation speed sensor 70, a turbine rotation speed sensor 72, an output rotation speed sensor 74, an MG rotation speed sensor 76, an accelerator operation amount sensor 78, a throttle valve opening sensor 80, a brake switch 82, a battery sensor 84, an oil temperature sensor 86, etc.) provided in the vehicle 10.

Various command signals (for example, the engine control command signal Se for controlling the engine 12, the MG control command signal Sm for controlling the electric motor MG, the CB hydraulic control command signal Scb for controlling the engaging device CB, the K0 hydraulic control command signal Sk0 for controlling the K0 clutch 20, the LU hydraulic control command signal Slu for controlling the LU clutch 40, the EOP control command signal Seop for controlling the EOP 60, etc.) are output from the electronic control device 90 to each device (for example, the engine control device 50, the inverter 52, the hydraulic control circuit 56, the pump motor 62, etc.) provided in the vehicle 10.

In order to realize various controls in the vehicle 10, the electronic control device 90 includes a hybrid control means, that is, a hybrid control unit 92, a clutch control means, that is, a clutch control unit 94, and a shift control means, that is, a shift control unit 96.

The hybrid control unit 92 has a function as an engine control means that controls the operation of the engine 12, that is, an engine control unit 92a, and a function as an electric motor control means that controls the operation of the electric motor MG via the inverter 52, that is, an electric motor control unit 92b, and executes hybrid drive control and the like with the engine 12 and the electric motor MG using the above control functions.

The hybrid control unit 92 calculates the drive request amount for the vehicle 10 by the driver by applying the accelerator operation amount θacc and the vehicle speed V to the drive request amount map, for example. The drive request amount map indicates a relationship that is experimentally or designedly obtained and stored in advance, that is, a predetermined relationship. The drive request amount is, for example, the required drive torque Trdem for the drive wheels 14. The required drive torque Trdem [Nm] is, from a different point of view, the required drive power Prdem [W] at the vehicle speed V at that time. As the drive request amount, a required drive force Frdem [N] for the drive wheels 14, a required AT output torque for the transmission output shaft 26, and the like may be used. In the calculation of the drive request amount, the AT output rotation speed No or the like may be used instead of the vehicle speed V.

The hybrid control unit 92 outputs the engine control command signal Se that controls the engine 12 and the MG control command signal Sm that controls the electric motor MG to realize the required drive power Prdem in consideration of the transmission loss, the auxiliary load, the gear ratio γat of the automatic transmission 24, the rechargeable power Win and the dischargeable power Wout of the battery 54, and the like. The engine control command signal Se is, for example, a command value of the engine power Pe, which is the power of the engine 12 that outputs the engine torque Te at the engine rotation speed Ne at that time. The MG control command signal Sm is, for example, a command value of the power consumption Wm of the electric motor MG that outputs the MG torque Tm at the MG rotation speed Nm at that time.

The rechargeable power Win of the battery 54 is the maximum power that can be input that defines the limit of the input power of the battery 54, and indicates the input limit of the battery 54. The dischargeable power Wout of the battery 54 is the maximum power that can be output that defines the limit of the output power of the battery 54, and indicates the output limit of the battery 54. The rechargeable power Win and the dischargeable power Wout of the battery 54 are calculated by the electronic control device 90 based on, for example, the battery temperature THbat and the charge state value SOC [%] of the battery 54. The charge state value SOC of the battery 54 is a value indicating the charge state of the battery 54, and is calculated by the electronic control device 90 based on, for example, the battery charge/discharge current Ibat and the battery voltage Vbat.

When the required drive torque Trdem can be covered only by the output of the electric motor MG, the hybrid control unit 92 sets the traveling mode to the motor traveling (=EV traveling) mode. In the EV traveling mode, the hybrid control unit 92 performs EV traveling in which the K0 clutch 20 is in the released state and the vehicle travels using only the electric motor MG as a driving force source. On the other hand, when the required drive torque Trdem cannot be covered unless at least the output of the engine 12 is used, the hybrid control unit 92 sets the traveling mode to the engine traveling mode, that is, the hybrid traveling (=HV traveling) mode. In the HV traveling mode, the hybrid control unit 92 performs engine traveling, that is, HV traveling, in which the K0 clutch 20 is in the engaged state and the vehicle travels using at least the engine 12 as a driving force source. Even when the required drive torque Trdem can be covered using only the output of the electric motor MG, the hybrid control unit 92 establishes the HV traveling mode when the charge state value SOC of the battery 54 is less than a predetermined engine start threshold value, when warming up of the engine 12 or the like is required, and the like. The engine start threshold value is a predetermined threshold value for determining that the charge state value SOC indicates the need to forcibly start the engine 12 to charge the battery 54. In this way, the hybrid control unit 92 automatically stops the engine 12 during the HV traveling, restarts the engine 12 after the engine is stopped, or starts the engine 12 during the EV traveling based on the required drive torque Trdem or the like, thereby switching between the EV traveling mode and the HV traveling mode.

The hybrid control unit 92 further includes a function as an engine start determination means, that is, an engine start determination unit 92c, and a function as a start control means, that is, a start control unit 92d.

The engine start determination unit 92c determines whether there is a start request for the engine 12. For example, in the EV traveling mode, the engine start determination unit 92c determines whether there is a start request for the engine 12 based on whether the required drive torque Trdem has increased beyond the range where it can be covered only by the output of the electric motor MG, whether the engine 12 or the like needs to be warmed up, whether the charge state value SOC of the battery 54 is less than the engine start threshold value, or the like. Further, the engine start determination unit 92c determines whether the start control of the engine 12 is completed.

The clutch control unit 94 controls the K0 clutch 20 so as to execute the start control of the engine 12. For example, when the engine start determination unit 92c determines that there is a start request for the engine 12, the clutch control unit 94 outputs the K0 hydraulic control command signal Sk0 for controlling the K0 clutch 20 in the released state toward the engaged state to the hydraulic control circuit 56, so that the K0 torque Tk0 for transmitting to the engine 12 side the torque required for cranking the engine 12, which is the torque for increasing the engine rotation speed Ne, is acquired. That is, the clutch control unit 94 outputs to the hydraulic control circuit 56 the K0 hydraulic control command signal Sk0 for controlling the clutch actuator 120 so as to switch the control state of the K0 clutch 20 from the released state to the engaged state, when the engine 12 is started. In the present embodiment, the torque required for cranking the engine 12 is referred to as the required cranking torque Tcrn.

The start control unit 92d controls the engine 12 and the electric motor MG so as to execute the start control of the engine 12. For example, when the engine start determination unit 92c determines that there is a start request for the engine 12, the start control unit 92d outputs to the inverter 52 the MG control command signal Sm for outputting the required cranking torque Tcrn by the electric motor MG in accordance with the switching of the K0 clutch 20 to the engaged state by the clutch control unit 94. That is, when the engine 12 is started, the start control unit 92d outputs to the inverter 52 the MG control command signal Sm for controlling the electric motor MG so that the electric motor MG outputs the required cranking torque Tcrn.

Further, when the engine start determination unit 92c determines that there is a start request for the engine 12, the start control unit 92d outputs to the engine control device 50 the engine control command signal Se for starting fuel supply, ignition, or the like in conjunction with the cranking of the engine 12 by the K0 clutch 20 and the electric motor MG. That is, when the engine 12 is started, the start control unit 92d outputs to the engine control device 50 the engine control command signal Se for controlling the engine 12 so that the engine 12 starts operation.

At the time of cranking the engine 12, the cranking reaction force torque Trfcr, which is a reaction force torque associated with the engagement of the K0 clutch 20, is generated. This cranking reaction force torque Trfcr causes a feeling of pulling in the vehicle 10 due to inertia when the engine is started during the EV traveling, that is, a drop in the drive torque Tr. Therefore, the required cranking torque Tcrn output by the electric motor MG when starting the engine 12 is also the MG torque Tm for canceling out the cranking reaction force torque Trfcr. That is, the required cranking torque Tcrn is the K0 torque Tk0 required for cranking the engine 12, and corresponds to the MG torque Tm flowing from the electric motor MG side to the engine 12 side via the K0 clutch 20. The required cranking torque Tcrn is, for example, a constant cranking torque Tcr that is predetermined based on, for example, the specifications of the engine 12.

When the engine 12 is started during the EV traveling, the start control unit 92d outputs from the electric motor MG the MG torque Tm for the required cranking torque Tcrn in addition to the MG torque Tm for the EV traveling, that is, the MG torque Tm for generating the drive torque Tr. Thus, during the EV traveling, it is necessary to secure the required cranking torque Tcrn in preparation for starting the engine 12. Therefore, the range in which the required drive torque Trdem can be covered only by the output of the electric motor MG is the torque range obtained by subtracting the required cranking torque Tcrn from the maximum torque of the electric motor MG that can be output. The maximum torque of the electric motor MG that can be output is the maximum MG torque Tm that can be output with the dischargeable power Wout of the battery 54.

The shift control unit 96 determines the shift of the automatic transmission 24 by using, for example, a shift map indicating a predetermined relationship, and outputs to the hydraulic control circuit 56 the CB hydraulic control command signal Scb for executing the shift control of the automatic transmission 24 as needed. The shift map indicates, for example, a predetermined relationship having a shift line for determining the shift of the automatic transmission 24 on two-dimensional coordinates using the vehicle speed V and the required drive torque Trdem as variables. In the shift map, the AT output rotation speed No or the like may be used instead of the vehicle speed V, or the required drive force Frdem, the accelerator operation amount θacc, the throttle valve opening θth, or the like may be used instead of the required drive torque Trdem.

Here, in order to accurately control the control state of the K0 clutch 20 when the engine 12 is started, the K0 control phase definition Dphk0 is predetermined in the electronic control device 90, in which a plurality of progress stages, that is, phases that are divided for each control state of the K0 clutch 20 switched in the starting process of the engine 12 is defined for controlling the clutch actuator 120.

FIG. 3 is a chart illustrating each phase in the K0 control phase definition Dphk0. In FIG. 3, the K0 control phase definition Dphk0 includes definitions of phases such as "K0 standby", "quick apply", "constant pressure standby at the time of packing", "K0 cranking", "quick drain", "constant pressure standby before re-engagement", "initial rotation synchronization", "intermediate rotation synchronization", "end rotation synchronization", "engagement transition sweep", "full engagement transition sweep", "full engagement", "backup sweep", and "calculation stop".

The phase is transitioned to the "K0 standby" phase when there is a K0 standby determination when starting the start control of the engine 12. The "K0 standby" phase is a phase in which the K0 clutch 20 is made to stand by without starting the control at the start control of the engine 12.

The phase is transitioned to the "quick apply" phase when there is no K0 standby determination when starting the start control of the engine 12. Alternatively, the phase is transitioned to the "quick apply" phase from the "K0 standby" phase when the K0 standby determination is withdrawn during standby for the control start of the K0 clutch 20. The "quick apply" phase is a phase in which a quick apply that temporarily applies a high command value of the K0 hydraulic pressure PRk0 is executed to quickly complete the packing of the K0 clutch 20, and the initial responsiveness of the K0 hydraulic pressure PRk0 is improved. The command value of the K0 hydraulic pressure PRk0 is the hydraulic pressure command value for the solenoid valve for the K0 clutch 20 in the hydraulic control circuit 56 that outputs the adjusted K0 hydraulic pressure PRk0, that is, the K0 hydraulic control command signal Sk0.

The phase is transitioned to the "constant pressure standby at the time of packing" phase from the "quick apply" phase when the quick apply is completed. The "constant pressure standby at the time of packing" phase is a phase of standby at a constant pressure in order to complete the packing of the K0 clutch 20.

The phase is transitioned to the "K0 cranking" phase from the "constant pressure standby at the time of packing" phase when the packing of the K0 clutch 20 is completed. The "K0 cranking" phase is a phase in which the engine 12 is cranked by the K0 clutch 20.

The phase is transitioned to the "quick drain" phase from the "K0 cranking" phase when the cranking of the engine 12 is completed and there is a quick drain execution determination. The "quick drain" phase is a phase in which, the quick drain is executed in which the command value of a low K0 hydraulic pressure PRk0 is temporarily output so that a predetermined K0 hydraulic pressure PRk0, for example, a pack end pressure can be quickly made to standby in the next phase, that is, the "constant pressure standby before re-engagement" phase, to improve the initial responsiveness of the K0 hydraulic pressure PRk0.

The phase is transitioned to the "constant pressure standby before re-engagement" phase from the "K0 cranking" phase when the cranking of the engine 12 is completed and there is no quick drain execution determination. Alternatively, the phase is transitioned to the "constant pressure standby before re-engagement" phase from the "quick drain" phase when the quick drain is completed. The "constant pressure standby before re-engagement" phase is a phase of standby at a predetermined K0 torque Tk0 so as not to disturb the complete combustion of the engine 12. The complete combustion of the engine 12 is, for example, a state in which self-sustaining rotation due to the combustion of the engine 12 is stable after the initial combustion in which the ignition of the engine 12 is started. The fact that the complete combustion of the engine 12 is not disturbed means that the self-sustaining rotation of the engine 12 is not hindered.

The phase is transitioned to the "initial rotation synchronization" phase from the "constant pressure standby before re-engagement" phase when neither the transition condition to the "end rotation synchronization" phase nor the transition condition to the "intermediate rotation synchronization" phase are satisfied at the time of the complete combustion notification from the engine control unit 92a. The "initial rotation synchronization" phase is a phase in which the K0 torque Tk0 is controlled to assist the increase in the engine rotation speed Ne in order to quickly synchronize the engine rotation speed Ne and the MG rotation speed Nm. The transition condition to the "end rotation synchronization" phase and the transition condition to the "intermediate rotation synchronization" phase will be described later with reference to FIG. 5.

The phase is transitioned to the "intermediate rotation synchronization" phase from the "constant pressure standby before re-engagement" phase when the transition condition to the "end rotation synchronization" phase is not satisfied and the transition condition to the "intermediate rotation synchronization" phase is satisfied at the time of the complete combustion notification from the engine control unit 92a. Alternatively, the phase is transitioned to the "intermediate rotation synchronization" phase from the "initial rotation synchronization" phase when the transition condition to the "end rotation synchronization" phase is not satisfied and the transition condition to the "intermediate rotation synchronization" phase is satisfied during the execution of the "initial rotation synchronization" phase. The "intermediate rotation synchronization" phase is a phase in which the K0 torque Tk0 is controlled so that the engine 12 has an appropriate blowing amount (=Ne−Nm).

The phase is transitioned to the "end rotation synchronization" phase from the "constant pressure standby before re-engagement" phase when the transition condition to the "end rotation synchronization" phase is satisfied at the time of the complete combustion notification from the engine control unit 92a. Alternatively, the phase is transitioned to the "end rotation synchronization" phase from the "initial rotation synchronization" phase when the transition condition to the "end rotation synchronization" phase is satisfied during the execution of the "initial rotation synchronization" phase. Alternatively, the phase is transitioned to the "end rotation synchronization" phase from the "intermediate rotation synchronization" phase when the transition condition to the "end rotation synchronization" phase is satisfied during the execution of the "intermediate rotation synchronization" phase. Alternatively, the phase is transitioned to the "end rotation synchronization" phase from the "intermediate rotation synchronization" phase when, during the execution of the "intermediate rotation synchronization" phase, the shift control of the automatic transmission 24 is not performed and a state where it is predicted that the engine rotation speed Ne and the MG rotation speed Nm cannot be synchronized is continuously established for the forced rotation synchronization transition determination time or longer. The prediction of whether the engine rotation speed Ne and the MG rotation speed Nm can be synchronized is determined based on, for example, the K0 difference rotation ΔNk0, the change gradient of the engine rotation speed Ne, and the change gradient of the MG rotation speed Nm. The K0 difference rotation ΔNk0 is the difference rotation speed (=Nm−Ne) of the K0 clutch 20. The "end rotation synchronization" phase is a phase in which the K0 torque Tk0 is controlled to synchronize the engine rotation speed Ne and the MG rotation speed Nm.

The phase is transitioned to the "engagement transition sweep" phase from the "end rotation synchronization" phase when the rotation synchronization determination is established during the execution of the "end rotation synchronization" phase. The rotation synchronization determination is a determination as to whether the determination that the absolute value of the K0 difference rotation ΔNk0 is equal to or less than the predetermined rotation synchronization determination difference rotation is continuously made for the predetermined number of rotation synchronization determination times or more. The "engagement transition sweep" phase is a phase in which the K0 torque Tk0 is gradually increased to bring the K0 clutch 20 into the engaged state.

The phase is transitioned to the "full engagement transition sweep" phase from the "engagement transition sweep" phase when the K0 engagement determination is established during the execution of the "engagement transition sweep" phase. The K0 engagement determination is a determination as to whether the determination that the absolute value of the K0 difference rotation ΔNk0 is equal to or less than the predetermined full engagement transition sweep determination difference rotation is continuously made for the predetermined number of full engagement transition sweep determination times or more. Alternatively, the phase is transitioned to the "full engagement transition sweep" phase from the "engagement transition sweep" phase when the K0 rotation synchronization state cannot be maintained during the execution of the "engagement transition sweep" phase. The case where the K0 rotation synchronization state cannot be maintained means that the determination that the absolute value of the K0 difference rotation ΔNk0 exceeds the value obtained by adding the predetermined forced engagement transition determination difference rotation to the full engagement transition sweep determination difference rotation is continuously made for the predetermined number of rotation divergence full engagement transition sweep transition determination times or more. Alternatively, the phase is transitioned to the "full engagement transition sweep" phase from the "engagement transition sweep" phase when the elapsed time from the start of the "engagement transition sweep" phase exceeds the predetermined forced engagement transition determination time and the absolute value of the K0 difference rotation ΔNk0 is determined to be equal to or more than the predetermined full engagement transition sweep forced transition determination difference rotation. The "full engagement transition sweep" phase is a phase in which the K0 torque Tk0 is gradually increased to bring the K0 clutch 20 into the fully engaged state. To bring the K0 clutch 20 to the fully engaged state means, for example, increasing the K0 torque Tk0 to a state in which a safety factor that can guarantee the engagement of the K0 clutch 20 is applied.

The phase is transitioned to the "full engagement" phase from the "full engagement transition sweep" phase when the full engagement determination is established during the execution of the "full engagement transition sweep" phase. The full engagement determination is a determination as to whether the determination that the K0 torque Tk0 is equal to or larger than the value obtained by multiplying the required K0 torque Tk0n by the predetermined safety factor (>1) is continuously made for the predetermined number of complete synchronization determination times or more. The required K0 torque Tk0n is the K0 torque Tk0 required for the full engagement of the K0 clutch 20, and for example, the maximum value of the engine torque Te, the MG torque Tm, and the minimum full engagement guaranteed torque is selected. The minimum full engagement guaranteed torque is the minimum K0 torque Tk0 required for a predetermined full engagement. Alternatively, the phase is transitioned to the "full engagement" phase from the "full engagement transition sweep" phase when the elapsed time from the start of the "full engagement transition sweep" phase is equal to or more than the predetermined forced full engagement transition determination time and the absolute value of the K0 difference rotation ΔNk0 is determined to be equal to or more than the predetermined full engagement forced transition determination difference rotation. The "full engagement" phase is a phase in which the K0 clutch 20 is maintained in a fully engaged state.

The phase is transitioned to the "full engagement" phase also from the "backup sweep" phase. The phase is transitioned to the "full engagement" phase from the "backup sweep" phase when, during the execution of the "backup sweep" phase, the full engagement determination is established and the determination that the absolute value of the K0 difference rotation ΔNk0 is equal to or less than the predetermined backup rotation synchronization determination difference rotation is continuously established for the predetermined number of backup rotation synchronization determination times or more. Alternatively, the phase is transitioned to the "full engagement" phase from the "backup sweep" phase when, during the execution of the "backup sweep" phase, the elapsed time from the transition to a phase other than the "K0 standby" phase after the start control of the engine 12 is started is equal to or more than the predetermined engine start control timeout time and the absolute value of the K0 difference rotation ΔNk0 is determined to be equal to or more than the full engagement forced transition determination difference rotation.

The phase is transitioned to the "backup sweep" phase from the running phase when, for example, during the execution of any one of the "K0 cranking" phase, the "constant pressure standby before re-engagement" phase, the "initial rotation synchronization" phase, the "intermediate rotation synchronization" phase, and the "end rotation synchronization" phase, in order to suppress the control stack, the elapsed time from the start of the running phase exceeds the predetermined backup transition determination time for the running phase, and the K0 difference rotation ΔNk0 is determined to be equal to or more than the predetermined backup transition determination difference rotation for the running phase. The "backup sweep" phase is a phase in which backup control is performed by gradually increasing the K0 torque Tk0 and engaging the K0 clutch 20.

The "calculation stop" phase is a phase in which the calculation of the base correction pressure of the K0 hydraulic pressure PRk0 and the required K0 torque Tk0$d$ used for the start control of the engine 12 is stopped while fail-safe control is being executed when the engine 12 is started. The fail-safe control is control for switching the oil passage in the hydraulic control circuit 56 so as to supply the K0 hydraulic pressure PRk0 capable of maintaining the fully engaged state of the K0 clutch 20 to the clutch actuator 120 without going through the solenoid valve for the K0 clutch 20 when, for example, a failure occurs in which the K0 hydraulic pressure PRk0 adjusted by the solenoid valve for the K0 clutch 20 in the hydraulic control circuit 56 is not output. The K0 hydraulic pressure PRk0 capable of maintaining the fully engaged state is a source pressure such as a line pressure supplied to the solenoid valve for the K0 clutch 20 or the like, for example. The base correction pressure is a value obtained by correcting the base pressure of the K0 hydraulic pressure PRk0 used for the start control of the engine 12 based on the hydraulic oil temperature THoil or the like. The required K0 torque Tk0$d$ is the K0 torque Tk0 required for cranking the engine 12 and switching the K0 clutch 20 to the engaged state at the time of the start control of the engine 12.

The K0 control phase definition Dphk0 is created for the purpose of calculating the base correction pressure of the K0 hydraulic pressure PRk0 and the required K0 torque Tk0$d$ used for the start control of the engine 12, for example. The K0 control phase definition Dphk0 defines each phase based on the required state of control for the K0 clutch 20 to control the K0 hydraulic pressure PRk0 and the K0 torque Tk0. That is, the K0 control phase definition Dphk0 is defined based on the control request for switching the control state of the K0 clutch 20.

When the engine 12 is started, the clutch control unit 94 controls the clutch actuator 120 so as to switch the control state of the K0 clutch 20 from the released state to the engaged state based on the K0 control phase definition Dphk0.

When the engine 12 is started, the start control unit 92$d$ controls the electric motor MG and the engine 12 in accordance with the control state of the K0 clutch 20. In the start control of the engine 12, the electric motor MG may be controlled so that the required cranking torque Tcrn is output by the electric motor MG, and the engine 12 may be controlled so that the engine 12 starts operation. Therefore, when the engine 12 is started, the start control unit 92$d$ controls the electric motor MG and the engine 12 based on the phases necessary for controlling the electric motor MG and the engine 12 in the K0 control phase definition Dphk0. As a result, control can be simplified when the engine 12 is started.

Figure 4A:
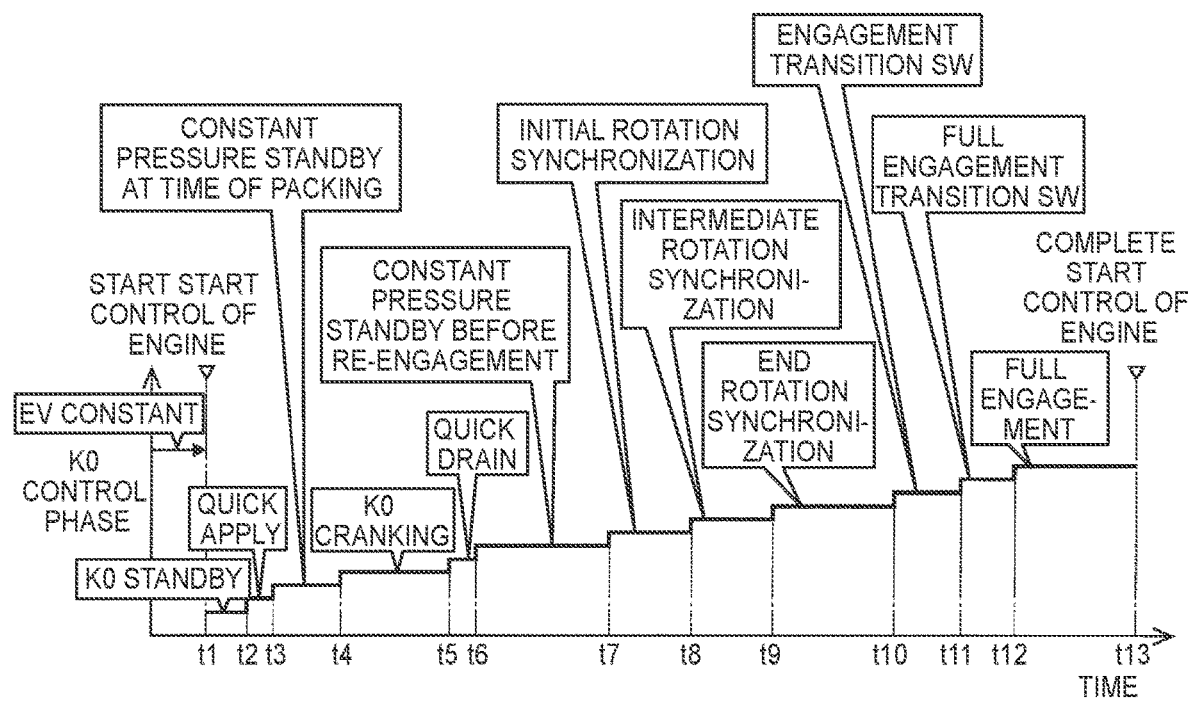
FIG. 4A is a diagram showing an example of a time chart when start control of an engine is executed.
Figure 4B:
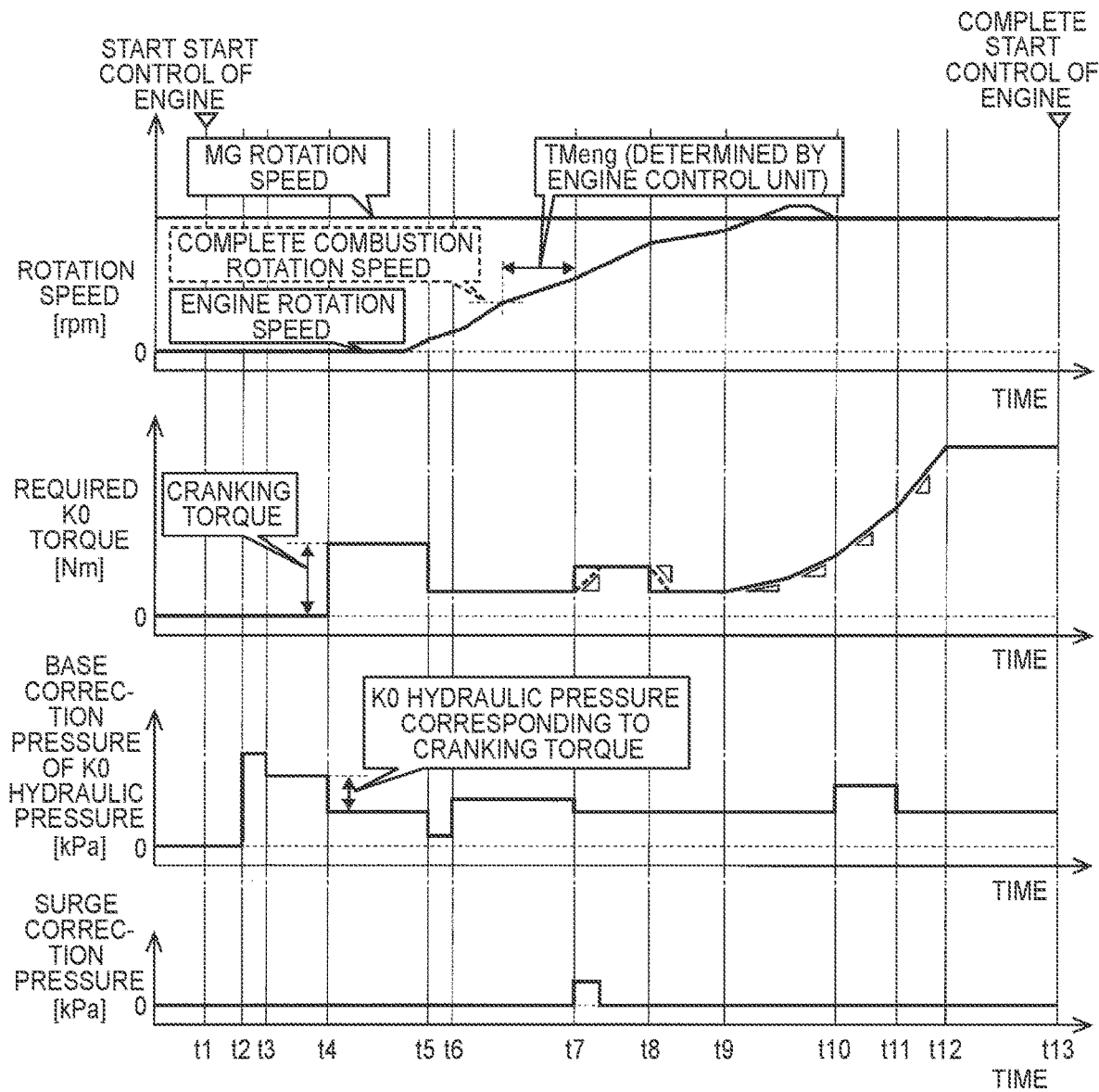
FIG. 4B is a diagram showing an example of a time chart when start control of an engine is executed.

FIG. 4A and FIG. 4B are diagrams showing an example of a time chart when the start control of the engine 12 is executed. In FIG. 4A, the "K0 control phase" indicates the transition state of each phase in the K0 control phase definition Dphk0. Further, the total hydraulic pressure value obtained by adding the hydraulic pressure value obtained by converting the required K0 torque Tk0$d$ to the K0 hydraulic pressure PRk0 to the base correction pressure of the K0 hydraulic pressure PRk0 is output as the command value of the K0 hydraulic pressure PRk0. The time point t1 indicates the time when a start request for the engine 12 is made and the start control of the engine 12 is started when the vehicle is stopped in the idle state in the EV traveling mode or during the EV traveling. After starting the start control of the engine 12, the "K0 standby" phase (see time point t1 to time point t2), the "quick apply" phase (see time point t2 to time point t3), and the "constant pressure standby at the time of packing" phase (see time point t3 to time point t4) are executed. Following the packing control of the K0 clutch 20, the "K0 cranking" phase is executed (see time point t4 to time point t5). In the embodiment of FIG. 4A and FIG. 4B, the K0 hydraulic pressure PRk0 corresponding to the required cranking torque Tcrn required in the "K0 cranking" phase is added in the "constant pressure standby at the time of packing" phase. In the "constant pressure standby at the time of packing" phase, the actual K0 hydraulic pressure PRk0 is not raised to a value equal to or more than the value that generates the K0 torque Tk0. In the "K0 cranking" phase, the actual K0 hydraulic pressure PRk0 is raised to a value equal to or more than the value that generates the K0 torque Tk0. In the "K0 cranking" phase, the required K0 torque Tk0$d$, that is, the MG torque Tm having a magnitude corresponding to the required cranking torque Tcrn is output from the electric motor MG. In the "K0 cranking" phase, when the engine rotation speed Ne is increased, ignition or the like is started and the engine 12 is combusted for the first time. When the ignition start is performed, for example, the engine 12 is first combusted substantially at the same time as the start of increasing the engine rotation speed Ne. After the first combustion of the engine 12, the "quick drain" phase (see time point t5 to time point t6) and the "constant pressure standby before re-engagement" phase (see time point t6 to time point t7) are executed, in which a low command value of K0 hydraulic pressure PRk0 is temporarily output, following the "K0 cranking" phase so as not to disturb the complete combustion of the engine 12. When the engine complete combustion notification is output from the engine control unit 92$a$ (see time point t7), the "initial rotation synchronization" phase (see time point t7 to time point t8), the "intermediate rotation synchronization" phase (see time point t8 to time point t9), the "end rotation synchronization" phase (see time point t9 to time point t10), and the "engagement transition sweep ("engagement transition SW" in FIG. 4A)" phase (see time point t10 to time point t11) are executed, and rotation synchronization control of the engine 12 and the electric motor MG is executed. Following the "engagement transition sweep" phase, the "full engagement transition sweep ("full engagement transition SW" in FIG. 4A)" phase is executed (see time point t11 to time point t12), and the K0 torque Tk0 is gradually increased to the state in which the safety factor that can guarantee the engagement of the K0 clutch 20 is applied. When the K0 torque Tk0 is raised to a state in which the safety factor that can guarantee the engagement of the K0 clutch 20 is applied, the "full engagement" phase is executed (see time point t12 to time point t13), and the fully engaged state of the K0 clutch 20 is maintained. Time point t13 indicates the time point when the start control of the engine 12 is completed. Although the phases described above are not illustrated in FIG. 4B, periods in FIG. 4B correspond to periods of phases illustrated in FIG. 4A respectively.

With reference to the "K0 cranking" phase of FIG. 3, FIG. 4A and FIG. 4B, when the engine 12 is started, during the transition in which the control state of the K0 clutch 20 is switched from the released state to the engaged state, the clutch control unit 94 controls the clutch actuator 120 so that the K0 clutch 20 transmits the cranking torque Tcr that increases the engine rotation speed Ne. For example, in the "K0 cranking" phase, the clutch control unit 94 controls the clutch actuator 120 by outputting to the hydraulic control circuit 56 the command value of the K0 hydraulic pressure PRk0 for cranking to supply the K0 hydraulic pressure PRk0 to the clutch actuator 120 so that the K0 clutch 20 transmits the cranking torque Tcr that increases the engine rotation speed Ne.

In the case where the first combustion of the engine 12 is performed at the beginning of the "K0 cranking" phase, the "quick drain" phase, or the "constant pressure standby before re-engagement" phase, when the K0 clutch 20 has a K0 torque Tk0 equivalent to, for example, the cranking torque Tcr even after the engine rotation speed Ne is increased by the cranking in the "K0 cranking" phase, it is necessary to increase the engine rotation speed Ne considering the inertia on the downstream side of the K0 clutch 20 such as the electric motor MG and the automatic transmission 24, for increasing the engine rotation speed Ne by the engine 12 by self-sustaining rotation. In this case, the starting shock may increase and the drivability may be deteriorated, or the energy efficiency may be deteriorated, and thus the starting performance of the engine 12 may be deteriorated.

The "constant pressure standby before re-engagement" phase in the above-mentioned K0 control phase definition Dphk0 is a phase provided in order to cope with the above-mentioned issue, that is, to suppress the influence of inertia on the downstream side of the K0 clutch 20. With reference to the "constant pressure standby before re-engagement" phase of FIG. 3, FIG. 4A and FIG. 4B, when the engine 12 is started, after the cranking of the engine 12 is completed or after the quick drain is completed, the clutch control unit 94 outputs to the hydraulic control circuit 56 a predetermined command value of the K0 hydraulic pressure PRk0 smaller than the command value of the K0 hydraulic pressure PRk0 for cranking so as to reduce the K0 torque Tk0 from the cranking torque Tcr. That is, when the engine 12 is started, after the control of the clutch actuator 120 in which the K0 clutch 20 transmits the cranking torque Tcr is completed, the clutch control unit 94 controls the clutch actuator 120 so as to temporarily set the K0 torque Tk0 to a predetermined torque Tk0f smaller than the cranking torque Tcr.

The predetermined command value of the K0 hydraulic pressure PRk0 and the predetermined torque Tk0f are, for example, predetermined values so that the K0 torque Tk0 does not interfere with the self-sustaining rotation of the engine 12, that is, predetermined values so that the K0 torque Tk0 does not disturb the complete combustion of the engine 12 to suppress an adverse effect on the engine control. Therefore, the clutch control unit 94 controls the clutch actuator 120 so that the K0 torque Tk0 becomes the predetermined torque Tk0f during the period of standby for the complete combustion of the engine 12. After determination of the complete combustion of the engine 12, the clutch control unit 94 controls the clutch actuator 120 so as to proceed with the switching of the K0 clutch 20 to the engaged state.

Specifically, the clutch control unit 94 determines the transition from the "constant pressure standby before re-engagement" phase when the clutch control unit 94 determines the transition to the "end rotation synchronization" phase, the "intermediate rotation synchronization" phase, the "initial rotation synchronization" phase, or the "backup sweep" phase in the "constant pressure standby before re-engagement" phase.

Figure 5:
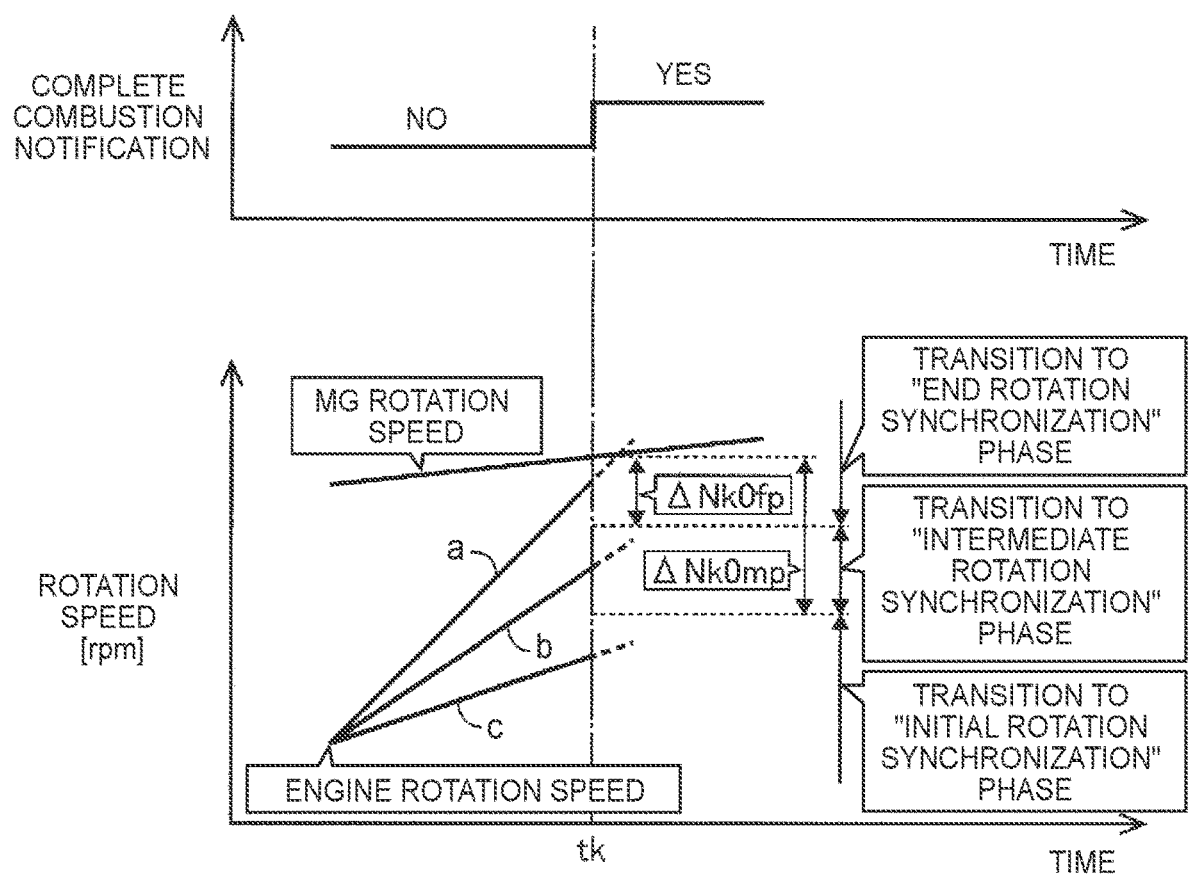
FIG. 5 is a diagram illustrating an example of a transition from a "constant pressure standby before re-engagement" phase.

The clutch control unit 94 determines the transition to the "end rotation synchronization" phase when the transition condition to the "end rotation synchronization" phase is satisfied at the time of the complete combustion notification from the engine control unit 92a. The engine control unit 92a outputs the complete combustion notification of the engine 12 (see FIG. 4A and FIG. 4B) when, for example, the elapsed time from the time when the engine rotation speed Ne reaches the predetermined complete combustion rotation speed of the engine 12 exceeds the predetermined complete combustion notification standby time TMeng. The complete combustion notification standby time TMeng is predetermined in consideration of, for example, the exhaust gas requirement for the engine 12. The transition condition to the "end rotation synchronization" phase is, for example, as shown in FIG. 5, a condition that the K0 difference rotation $\Delta Nk0$ is equal to or less than the predetermined end rotation synchronization transition determination difference rotation $\Delta Nk0fp$. Time point tk in FIG. 5 indicates the time point when the complete combustion notification is output from the engine control unit 92a and the complete combustion notification flag is set to "Yes". At the engine rotation speed Ne shown by the solid line a in FIG. 5, since the K0 difference rotation $\Delta Nk0$ is equal to or less than the end rotation synchronization transition determination difference rotation $\Delta Nk0fp$ at time point tk, the transition to the "end rotation synchronization" phase is determined. The value of the end rotation synchronization transition determination difference rotation $\Delta Nk0fp$ is larger so that, for example, the phase shifts to the "end rotation synchronization" phase early and the K0 torque Tk0 can be started to be input when the change gradient of the engine rotation speed Ne is large, as compared to when the change gradient of the engine rotation speed Ne is small. Alternatively, the value of the end rotation synchronization transition determination difference rotation $\Delta Nk0fp$ is larger so that, for example, the shock at the time of rotation synchronization is reduced in the "end rotation synchronization" phase when the throttle valve opening θth is large, as compared to when the throttle valve opening θth is small.

The clutch control unit 94 determines the transition to the "intermediate rotation synchronization" phase when the transition condition to the "end rotation synchronization" phase is not satisfied and the transition condition to the "intermediate rotation synchronization" phase is satisfied at the time of the complete combustion notification from the engine control unit 92a. The transition condition to the "intermediate rotation synchronization" phase is, for example, as shown in FIG. 5, a condition that the K0 difference rotation ΔNk0 is equal to or less than the predetermined intermediate rotation synchronization transition determination difference rotation ΔNk0mp. The intermediate rotation synchronization transition determination difference rotation ΔNk0mp is a value larger than the end rotation synchronization transition determination difference rotation ΔNk0fp. At the engine rotation speed Ne shown by the solid line b in FIG. 5, since the K0 difference rotation ΔNk0 exceeds the end rotation synchronization transition determination difference rotation ΔNk0fp and is equal to or less than the intermediate rotation synchronization transition determination difference rotation ΔNk0mp at time point tk, the transition to the "intermediate rotation synchronization" phase is determined. The value of the intermediate rotation synchronization transition determination difference rotation ΔNk0mp is larger so that, for example, the phase shifts to the "intermediate rotation synchronization" phase early and the blowing amount of the engine 12 can be adjusted when the change gradient of the engine rotation speed Ne is large, as compared to when the change gradient of the engine rotation speed Ne is small. Adjusting the blowing amount of the engine 12 means, for example, adjusting the change gradient of the engine rotation speed Ne.

The clutch control unit 94 determines the transition to the "initial rotation synchronization" phase when neither the transition condition to the "end rotation synchronization" phase nor the transition condition to the "intermediate rotation synchronization" phase are satisfied at the time of the complete combustion notification from the engine control unit 92a. At the engine rotation speed Ne shown by the solid line c in FIG. 5, since the K0 difference rotation ΔNk0 exceeds the intermediate rotation synchronization transition determination difference rotation ΔNk0mp at time point tk, the transition to the "initial rotation synchronization" phase is determined.

The clutch control unit 94 determines the transition to the "backup sweep" phase when the elapsed time from the start of the "constant pressure standby before re-engagement" phase exceeds the predetermined backup transition determination time for the "constant pressure standby before re-engagement" phase, and the K0 difference rotation ΔNk0 is equal to or more than the predetermined backup transition determination difference rotation for the "constant pressure standby before re-engagement" phase.

In the "constant pressure standby before re-engagement" phase, when control is performed in which the K0 torque Tk0 is set to the predetermined torque Tk0f, the influence of the inertia on the downstream side of the K0 clutch 20 is suppressed, so that the engine rotation speed Ne can be quickly brought closer to the synchronous rotation with the MG rotation speed. As a result, the starting shock is suppressed or the deterioration of energy efficiency is suppressed. However, in the control in which the K0 torque Tk0 is set to the predetermined torque Tk0f, the engine rotation speed Ne can be quickly brought closer to the synchronous rotation with the MG rotation speed Nm, but since the K0 torque Tk0 in the K0 clutch 20 itself is reduced, transmission of the engine torque Te to the downstream side of the K0 clutch 20 is likely to be delayed.

Thus, the clutch control unit 94 may perform control in which the K0 torque Tk0 is set to the predetermined torque Tk0f at the time of starting the engine 12 when the suppression of the starting shock or the suppression of the deterioration of the energy efficiency is prioritized over the acceleration response, and may avoid performing control in which the K0 torque Tk0 is set to the predetermined torque Tk0f so that the engine torque Te is quickly transmitted to the downstream side of the K0 clutch 20 at the time of starting the engine 12 when the acceleration response is prioritized over the suppression of the starting shock or the suppression of the deterioration of the energy efficiency.

When starting the engine 12 with priority on the suppression of the starting shock or the suppression of the deterioration of the energy efficiency is, for example, when starting the engine 12 upon determination by the engine start determination unit 92c that there is a start request for the engine 12 due to the need to warm up the engine 12 and the like or the charge state value SOC of the battery 54 being less than the engine start threshold value. That is, when starting the engine 12 with priority on the suppression of the starting shock or the suppression of the deterioration of the energy efficiency is when starting the engine 12 when the start of the engine 12 is requested due to the request made to warm up the engine 12, or when starting the engine 12 when the start of the engine 12 is requested due to the request made for charging the battery 54 by the generated electric power of the electric motor MG using the power of the engine 12.

When starting the engine 12 with priority on the acceleration response is, for example, when starting the engine 12 when the engine start determination unit 92c determines that there is a start request for the engine 12 due to an increase in the required drive torque Trdem beyond the range in which the required drive torque Trdem can be covered only by the output of the electric motor MG. That is, when starting the engine 12 in which the acceleration response is prioritized is when starting the engine 12 when the start of the engine 12 is requested due to the increase in the drive request amount for the vehicle 10 by the driver. Specifically, when starting the engine 12 with priority on the acceleration response may be when starting the engine 12 when the start of the engine 12 is requested due to the determination made that the accelerator operation amount θacc is the maximum amount.

The clutch control unit 94 determines whether the current state is starting the engine 12 with priority on the acceleration response. In the "constant pressure standby before re-engagement" phase, the clutch control unit 94 does not perform the control in which the K0 torque Tk0 is set to the predetermined torque Tk0f when it is determined that the engine 12 is started with priority on the acceleration response.

Not performing the control in which the K0 torque Tk0 is set to the predetermined torque Tk0f means, for example, restricting the setting of the K0 torque Tk0 to the predetermined torque Tk0f, that is, setting the K0 torque Tk0 to a value smaller than the cranking torque Tcr and larger than the predetermined torque Tk0f. Alternatively, not performing the control in which the K0 torque Tk0 is set to the predetermined torque Tk0f means, for example, instead of performing the control in which the K0 torque Tk0 is set to the predetermined torque Tk0f, maintaining the K0 torque Tk0 at the cranking torque Tcr, or setting the K0 torque Tk0 to a value larger than the cranking torque Tcr.

The clutch control unit 94 restricts the control of the clutch actuator 120 in which the K0 torque Tk0 is set to the predetermined torque Tk0f in the "constant pressure standby before re-engagement" phase when the start of the engine 12 is requested due to an increase in the drive request amount for the vehicle 10 by the driver. Alternatively, when the start of the engine 12 is requested due to an increase in the drive request amount for the vehicle 10 by the driver, instead of restricting the control of the clutch actuator 120 in which the K0 torque Tk0 is set to the predetermined torque Tk0f, the clutch control unit 94 controls the clutch actuator 120 so that the K0 torque Tk0 is equal to or larger than the cranking torque Tcr, in the "constant pressure standby before re-engagement" phase.

FIG. 6 is a flowchart illustrating a main part of the control operation of the electronic control device 90, and is a flowchart illustrating the control operation for improving the starting performance of the engine 12 when the engine 12 is started. The control operation is executed repeatedly, for example.

In FIG. 6, first, in step (hereinafter, "step" is omitted) S10 corresponding to the function of the clutch control unit 94, it is determined whether to transition from the "K0 cranking" phase or the "quick drain" phase to the "constant pressure standby before re-engagement" phase. When the determination of S10 is denied, this routine is terminated. When the determination in S10 is affirmed, it is determined in S20 corresponding to the function of the clutch control unit 94 whether the current state is starting the engine 12 with priority on the acceleration response. When the determination in S20 is denied, in S30 corresponding to the function of the clutch control unit 94, the clutch actuator 120 is controlled so that the K0 torque Tk0 is set to a predetermined torque Tk0f smaller than the cranking torque Tcr. Next, in S40 corresponding to the function of the clutch control unit 94, it is determined whether to transition from the "constant pressure standby before re-engagement" phase. When the determination of S40 is denied, the above S30 is executed. When the determination of S40 is affirmed, this routine is terminated. On the other hand, when the determination in S20 is affirmed, in S50 corresponding to the function of the clutch control unit 94, the clutch actuator 120 is controlled so that the K0 torque Tk0 is set to a value equal to or larger than the cranking torque Tcr. Alternatively, the control of the clutch actuator 120 in which the K0 torque Tk0 is set to the predetermined torque Tk0f is restricted. Next, in S60 corresponding to the function of the clutch control unit 94, it is determined whether to transition from the "constant pressure standby before re-engagement" phase. When the determination of S60 is denied, the above S50 is executed. When the determination of S60 is affirmed, this routine is terminated.

As described above, according to the present embodiment, when the engine 12 is started, after the control of the clutch actuator 120 in which the K0 clutch 20 transmits the cranking torque Tcr is completed, the clutch actuator 120 is controlled so as to temporarily set the K0 torque Tk0 to a predetermined torque Tk0f smaller than the cranking torque Tcr. Thus, after the engine rotation speed Ne is increased by cranking, the engine rotation speed Ne is increased in a state where the influence of inertia on the downstream side of the K0 clutch 20 such as the electric motor MG is suppressed. As a result, the engine rotation speed Ne is quickly increased toward the synchronous rotation with the MG rotation speed Nm, which suppresses the starting shock to improve the drivability, or improves the energy efficiency. Therefore, when the engine 12 is started, the starting performance of the engine 12 can be improved.

Further, according to the present embodiment, when the engine 12 is started, the influence of the K0 clutch 20 can be suppressed in the process of increasing the engine rotation speed Ne, so that an adverse effect on the engine control is suppressed and the influence on the exhaust gas of the engine 12 or the like can be suppressed.

Further, according to the present embodiment, the clutch actuator 120 is controlled so that the K0 torque Tk0 is set to the predetermined torque Tk0f during the period of the standby for the complete combustion of the engine 12, so that after the engine rotation speed Ne is increased by cranking, the disturbance to the complete combustion of the engine 12 is suppressed and the deterioration of the starting control of the engine 12 is suppressed.

Further, according to the present embodiment, after the complete combustion of the engine 12 is determined, the clutch actuator 120 is controlled so as to proceed with the switching of the K0 clutch 20 to the engaged state, so that the control state of the K0 clutch 20 is appropriately switched to the engaged state while suppressing the hindrance to the self-sustaining rotation of the engine 12 during the transition when the control state of the K0 clutch 20 is switched from the released state to the engaged state.

Further, according to the present embodiment, the control of the clutch actuator 120 in which the K0 torque Tk0 is set to the predetermined torque Tk0f is restricted when the start of the engine 12 is requested due to an increase in the drive request amount by the driver. Thus, the switching of the K0 clutch 20 to the engaged state is accelerated. As a result, the engine torque Te is quickly transmitted to the drive wheels 14 side, and the acceleration response is improved.

Further, according to the present embodiment, when the start of the engine 12 is requested due to an increase in the drive request amount by the driver, instead of the control of the clutch actuator 120 in which the K0 torque Tk0 is set to the predetermined torque Tk0f, the clutch actuator 120 is controlled so that the K0 torque Tk0 is equal to or larger than the cranking torque Tcr. Thus, the switching of the K0 clutch 20 to the engaged state is accelerated. As a result, the engine torque Te is quickly transmitted to the drive wheels 14 side, and the acceleration response is improved.

Although the embodiment of the present disclosure has been described in detail with reference to the drawings, the present disclosure also applies to other modes.

For example, in the above-described embodiment, starting the engine 12 when the engine 12 needs to be warmed up and starting the engine 12 when the battery 54 needs to be charged have been illustrated as starting the engine 12 in which the suppression of the starting shock or the suppression of the deterioration of the energy efficiency is prioritized over the acceleration response, but the embodiment is not limited to this mode. For example, as starting the engine 12 in which the suppression of the starting shock or the suppression of the deterioration of the energy efficiency is prioritized over the acceleration response, cases may include starting the engine 12 when the start of the engine 12 is requested during the autonomous driving control that automatically performs acceleration/deceleration, braking, steering, etc., or the automatic vehicle speed control for controlling the vehicle speed V regardless of the accelerator operation amount θacc. In short, starting the engine 12 in which the suppression of the starting shock or the suppression of the deterioration of the energy efficiency is prioritized over the acceleration response only needs to be starting the engine 12 when the start of the engine 12 is required regardless of the driving operation of the driver.

Further, in the above-described embodiment, the clutch control unit 94 may control the clutch actuator 120 so as to uniformly set the K0 torque Tk0 to the predetermined torque Tk0f regardless of whether the acceleration response is prioritized in the "constant pressure standby before re-engagement" phase. In this case, S20, S50, and S60 in the flowchart of FIG. 6 are not necessary.

Further, in the above-described embodiment, as a starting method of the engine 12, a starting method has been illustrated in which the engine 12 is ignited in accordance with the cranking of the engine 12 during the transition where the K0 clutch 20 is switched from the released state to the engaged state, and the engine rotation speed Ne is increased in the engine 12 itself. As the starting method of the engine 12, for example, a starting method can be adopted in which the engine 12 is ignited after cranking the engine 12 until the K0 clutch 20 is brought into a fully engaged state or a state close to a fully engaged state, or the like. Alternatively, when the vehicle 10 is stopped while the MG rotation speed Nm is set to zero, a starting method can be adopted in which the engine 12 is ignited after cranking the engine 12 by the electric motor MG in the fully engaged state of the K0 clutch 20. Alternatively, when the vehicle 10 is equipped with a starter which is a dedicated motor for cranking the engine 12, for example, a starting method can be adopted in which the engine 12 is ignited after cranking the engine 12 with the starter, when the vehicle 10 is stopped while the MG rotation speed Nm is set to zero and the cranking by the electric motor MG cannot be sufficiently performed or cannot be performed due to extremely low outside air temperature.

Further, in the above-described embodiment, the planetary gear automatic transmission that constitutes a part of the power transmission path between the engine 12 and the drive wheels 14, and that functions as the automatic transmission 24 that transmits the drive force from each of the driving force sources (engine 12, electric motor MG) to the drive wheels 14 is illustrated. However, the embodiment is not limited to this mode. The automatic transmission 24 may be a known synchronous meshing parallel two-axis automatic transmission including a dual clutch transmission (DCT), a known belt-type continuously variable transmission, or the like.

Further, in the above-described embodiment, the torque converter 22 is used as the fluid transmission device, but the embodiment is not limited to this mode. For example, as the fluid transmission device, another fluid transmission device such as a fluid coupling having no torque amplification function may be used instead of the torque converter 22. Alternatively, the fluid transmission device does not necessarily have to be provided.

It should be noted that the embodiment described above is merely one embodiment, and the present disclosure can be implemented in a mode in which various changes and improvements are made based on the knowledge of those skilled in the art.

What is claimed is:

1. A control device for a vehicle including an engine, an electric motor connected to a power transmission path between the engine and drive wheels so as to be able to transmit power, and a clutch provided between the engine and the electric motor in the power transmission path, a control state of the clutch configured to be switched by controlling a clutch actuator, the control device comprising an electronic control unit configured to:
   perform, when the engine is started, a first clutch actuator control in which the clutch transmits a cranking torque for increasing a rotation speed of the engine during a transition in which the control state of the clutch is switched from a released state to an engaged state;
   perform, when the engine is started, first control for outputting the cranking torque by the electric motor and second control for starting operation of the engine; and
   perform, after the first clutch actuator control is completed, a second clutch actuator control in which a torque capacity of the clutch is set to a predetermined torque smaller than the cranking torque,
   wherein the electronic control unit is configured to set the torque capacity of the clutch to a value larger than the cranking torque instead of executing the second clutch actuator control when a start of the engine is requested due to an increase in a drive request amount for the vehicle by a driver.

2. The control device according to claim 1, wherein the electronic control unit is configured to perform the second clutch actuator control during a period of standby for a complete combustion of the engine.

3. The control device according to claim 2, wherein the electronic control unit is configured to proceed with switching of the clutch to the engaged state after the complete combustion of the engine is determined.

* * * * *